C. G. MOREMEN.
COVERERS FOR CORN-PLANTERS.
No. 177,740.  Patented May 23, 1876.
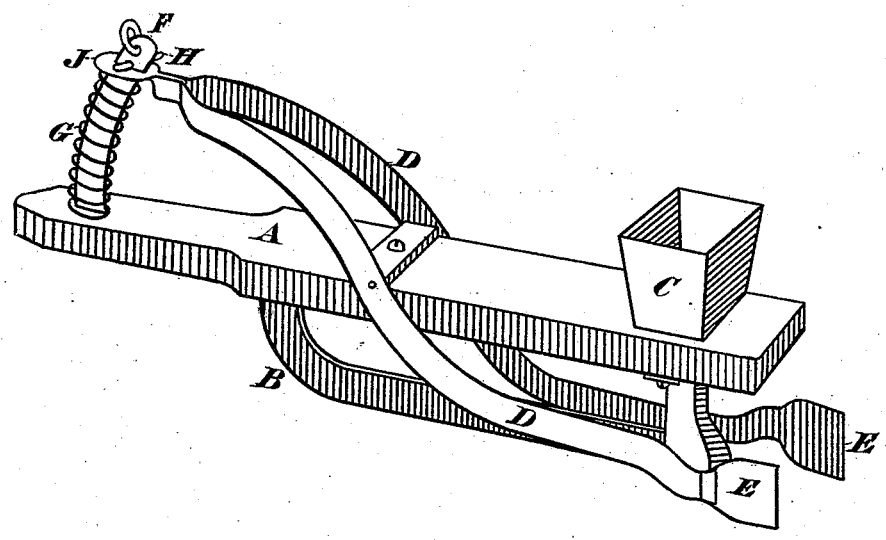
WITNESSES.  INVENTOR.

UNITED STATES PATENT OFFICE.

CHARLES G. MOREMEN, OF MEAD COUNTY, KENTUCKY.

IMPROVEMENT IN COVERERS FOR CORN-PLANTERS.

Specification forming part of Letters Patent No. 177,740, dated May 23, 1876; application filed May 12, 1876.

*To all whom it may concern:*

Be it known that I, CHARLES G. MOREMEN, of Mead county, in the State of Kentucky, have invented a certain new and useful Improvement in Coverers for a Corn-Planter; and I do hereby declare that the following is a full, clear, and exact description thereof, which will enable others skilled in the art to make and use the same, reference being had to the accompanying drawings forming part of this specification.

The drawing is a perspective view of the device, showing its general construction.

This invention, as will be seen by reference to the drawing, consists in the use of two curved bars of iron or levers, secured to the sides of the planter-frame, so as to admit of being raised or lowered. These bars are connected in front by means of a flat piece of iron, one end of which has a hole through it sufficiently large to work over the standard on the beam, while the other terminates in flanges to receive the ends of the levers, where they are held firmly by means of a bolt through them, while the other ends of these levers are made to extend back of the drop-spout, and are each provided with a hoe-shaped blade, slightly turned in toward each other, the object of which is to force the soil to the center, and thereby more effecually cover the corn than could possibly be done by the ordinary devices now used on corn-planters for that purpose, and may be adjusted to any depth by means of a pin through the standard on the beam which holds it in position.

This device will be more fully illustrated in detail by reference to the drawings, in which A is the beam of the planter. B is the opener, and C is the corn-box. D D are the levers or side bars constituting the principal features of my invention, all of which are made in form as shown in the drawing, and hinged to the sides of the frame in such a manner as to be easily raised or lowered in order to adjust the depth of the coverers. E E are these hoe-shaped blades or coverers attached to the end of the levers, which are made to turn in slightly, so as to throw the soil into the center as they pass along, thereby effectually covering the seed as it is dropped. F is a curved standard, secured to the beam of the planter. G is a spiral spring around the same, for the purpose of holding the levers in position when set, and also to relieve the shock in striking an obstruction. H H are holes in the standard, in which a small pin is inserted to hold the levers in position. J is a flat piece, having an eye in one end to pass over the standard on the beam, while the other terminates in flanges, by means of which the two levers are connected in front and held firmly by a bolt through both.

Having thus fully described the nature and object of this my invention, what I claim as new, and desire to seure by Letters Patent, is—

The levers D D, with their coverers E E and eye-piece J, as above described, in combination with the standard F and spring G, arranged, constructed, and operated substantially as and for the purpose hereinbefore set forth.

CHARLES G. MOREMEN.

Witnesses:
C. HEWITT,
FRANK PARDON.